United States Patent [19]

Takata et al.

[11] Patent Number: 5,561,815
[45] Date of Patent: Oct. 1, 1996

[54] SYSTEM AND METHOD FOR CONTROL OF COEXISTING CODE AND IMAGE DATA IN MEMORY

[75] Inventors: Yutaka Takata, Kanagawa-ken; Yoshinori Okami, Odawara; Naoya Takahashi; Haruka Kashiwazaki, both of Yokohama, all of Japan

[73] Assignees: Hitachi, Ltd., Tokyo; Hitachi Software Engineering Co., Ltd., Kanagawa-ken, both of Japan

[21] Appl. No.: 341,282

[22] Filed: Nov. 16, 1994

Related U.S. Application Data

[63] Continuation of Ser. No. 769,316, Oct. 1, 1991, abandoned.

[30] Foreign Application Priority Data

Oct. 2, 1990 [JP] Japan ................................. 2-264745

[51] Int. Cl.$^6$ ...................................................... H01J 3/00
[52] U.S. Cl. ........................ 395/833; 395/828; 395/404; 395/439; 369/32; 364/DIG. 1; 364/DIG. 2
[58] Field of Search ................................... 395/275, 425, 395/600, 404, 439, 828, 833; 364/DIG. 1, DIG. 2; 369/32

[56] References Cited

U.S. PATENT DOCUMENTS

| | | | |
|---|---|---|---|
| 4,760,526 | 7/1988 | Takeda et al. | 395/600 |
| 4,811,281 | 3/1989 | Okamoto et al. | 395/164 |
| 4,939,644 | 7/1990 | Harrington et al. | 395/825 |
| 4,964,039 | 10/1990 | Izawa et al. | 395/500 |
| 5,040,110 | 8/1991 | Miki et al. | 395/600 |
| 5,210,866 | 5/1993 | Milligan et al. | 395/182.04 |
| 5,214,626 | 5/1993 | Satoh et al. | 369/32 |
| 5,226,157 | 7/1993 | Nakano et al. | 395/600 |

*Primary Examiner*—Tod R. Swann
*Assistant Examiner*—J. Peikari
*Attorney, Agent, or Firm*—Antonelli, Terry, Stout & Kraus

[57] ABSTRACT

In an information storage system having at least a storage medium which includes a plurality of storage areas. Each storage area is associated with one logical drive. Using a control device and in conjunction with an I/O control device and a memory, the system can process coexisting code and image information to permit a designated logical drive to access an area of the storage areas that corresponds to the designated logical drive according to correspondence relation information.

18 Claims, 8 Drawing Sheets

ADDR 1' = ADDR 2 + ADDR 1

SYSTEM AND METHOD FOR CONTROL OF COEXISTING CODE AND IMAGE DATA IN MEMORY

This is a continuation, of application Ser. No. 07/769,316, filed Oct. 1, 1991, now abandoned.

BACKGROUND OF THE INVENTION

1. Field of the Invention

The present invention relates to an information storing method and an information storing system wherein information is written into and read out of a storage medium such as an optical disk. More particularly, it relates to an information storing method and an information storing system wherein data to be treated by a generalized operating system can be stored in and reproduced from a storage medium in a state which is ready to be treated by the operating system.

2. Description of the Prior Art

In recent years, optical disks have been developed as media for storing information, and they have been used for storing image information because of their large storage capacities. Most notably, a rewritable type of optical disk permits information to be rewritten like a conventional magnetic disk and is therefore utilized for the construction of a file system.

In this regard, since the optical disks have been chiefly employed for the storage of image information, writing and reading the image information into and from the storage medium normally employs dedicated processing programs. In case of storing code data, therefore, the code data needs to be first converted into image data, and then be stored. This method, however, poses the problem that the data retrieved cannot be directly utilized, and a process for converting the image data into code data is required.

On the other hand, a technique for storing image data and code data coexistingly on an optical disk is discussed in a treatise, "Izawa et al.: Toshiba Review, 1989, Vol. 44, No. 1, pp. 49–52". The technique includes generating on the optical disk an area having a hierarchical storage structure (data organization and format), and storing the code data in the lowermost layer of the hierarchic structure for storing the image data items. With this technique, information for distinguishing the image data and the code data is appended to each of those additional information (index information) items of the image data items which are held in 1:1 correspondence with these image data items. Thus, the code data left intact can be stored similarly to the image data.

The prior-art technique stores the code data within the storage structure for the image data. Accordingly, the code data can be accessed from an image processing program. The technique, however, has had the problem that, in a case where the code data is to be accessed from another program having different storage structure, such as a generalized operating system, it cannot be directly accessed. In this case, it has been necessary to access the code data through another storage medium, such as a floppy disk, having a storage structure which the other program can deal with. Conversely, in order to permit the image processing program to access the code data, this program must know the storage structure of the other program, which is burdensome.

Therefore, in an information storing system having dedicated processing programs for storing and reproducing image information, it is desired to develop a system wherein data to be treated by a generalized operating system can be stored on and reproduced from a storage medium in a state in which it can be directly treated by the operating system.

Meanwhile, as to the generalized operating system, for example, "MS-DOS" of Microsoft Inc., there is a technique wherein, in order to prevent the size of an available storage area from being limited by the size of the storage area of a physical memory, the area of the physical memory is segmented into a plurality of suitable sizes, and information is stored in each of the segmental areas which is logically regarded as one memory or one driver. In this case, the individual segmental areas of the storage area of the physical memory are uniquely endowed with logical driver identifiers. Data can be stored and reproduced in such a way that an operator designates the logical driver identifier without being conscious of the physical memory or the address of the area thereof. With this technique, the logical driver identifiers and the physical storage areas are held in 1:1 correspondence, and a the corresponding driver identifier is designated for each segmental storage area.

In the case where the storage medium is segmented into the plurality of areas endowed with the logical driver identifiers, respectively, the number of logical driver identifiers which can be bestowed is often finite. Besides, in order to simplify the bestowal of the logical driver identifiers, each logical driver identifier is defined using, for example, a single digit numeral or a letter of one character.

However, the number of the logical driver identifiers which can be bestowed might become deficient as the number of segmental areas increases with the enlargement of the physical storage capacity. By way of example, in a case where the physical memory itself has a very large storage capacity such as in an optical disk or where it is furnished with a large storage capacity as a whole by employing a large number of storage media, only part of the storage capacity is utilizable even with the maximum number of logical driver identifiers which can be bestowed.

In addition, in order to permit the information storing system to store and reproduce data into and from the storage area in the state in which the generalized operating system can handle, the pertinent storage area needs to be initialized to have a storage structure the operating system can deal with. Besides, in order to change the size of the segmental area after the storage area has been once initialized, this area needs to be initialized again. However, the initialization results in losing the stored data. Therefore, it is actually difficult to alter the size of the segmental area once it is set. It is accordingly considered to expand the segmental storage area associated with each logical driver identifier for the purpose of effectively using the physical storage capacity with the limited number of logical driver identifiers, but this measure is difficult to realize.

Incidentally, as to the storage of code data on an optical disk, there is a technique wherein the optical disk is deemed one virtual disk and is rendered accessible from an existing generalized OS (operating system) as discussed in the bulletin of the Institute of Electronics, Information and Communication Engineers of Japan, "D-I, Vol. J72-D-I, No. 6, pp. 414–422". The technique, however, makes the optical disk look like as if it were rewritable many times it supposes the virtual disk being a set of virtual sectors which can be repeatedly rewritten. It is not applicable to a rewritable type optical disk.

SUMMARY OF THE INVENTION

The first object of the present invention is to provide an information storing method and an information storing system in which a plurality of areas segmented into sizes treatable with a generalized operating system are formed in a storage medium, and in which the areas are managed by endowing them with logical driver identifiers, respectively.

Besides, the second object of the present invention is to provide an information storing method and an information storing system in which a large storage capacity is effectively utilized using a limited number of logical drivers.

In order to accomplish the first object, according to one aspect of the present invention, there is provided an information storing system having, at least, at least one storage medium, an input/output controller which controls inputting and outputting data to and from the storage medium, a control device for controlling the system including controlling writing and reading data, and console means for giving instructions to a control device, the control device comprises at least one logical drive means virtually set in said control device in order to access said storage medium. The system further comprises means for holding correspondent relation information on said each logical drive means which stipulates a correspondent relation between said logical drive means and an accessible data storage area of said storage medium; said input/output controller includes a control portion which operates, when the logical drive means to be used has been designated from said console means, in case of either of writing and reading data, to refer to the correspondent relation information held in said correspondent relation information-holding means and to permit the designated logical drive means to access the corresponding data storage area of said storage medium.

In order to accomplish the second object, according to another aspect of performance of the present invention, there is provided an information storing system in the first-mentioned aspect of performance, characterized in that the correspondent relation information is rewritable.

In addition, there is provided an information storing method characterized in that a code data area stores therein information which indicates a location of associated image data in an image data area, and that, in a reproducing mode, code data is reproduced, while the image data is simultaneously read out of said image data area with the information indicative of the location. Thus, the present invention provides the information storing method and the information storing system in which the image data and the code data can be respectively stored in association with each other, and in which the code data can be stored in conformity with a storage structure treatable with the generalized operating system.

In order to handle the storage medium of large capacity such as an optical disk, it has its storage area segmented and is used in segmental data area unit.

In the case of handling the storage medium, this medium itself and the segmental data areas as stated above are respectively brought into correspondence with the logical drivers, whereby data can be read out of or written into the storage medium by designating the logical driver. Moreover, the segmental data areas can be changed by altering the correspondence.

In allotting the data areas, the sizes thereof are set at will, whereby the optical disk can be used along with a floppy disk and a magnetic disk.

Further, data records can be stored in the data areas irrespective of the sorts of data such as code data or image data.

Besides, storage media which are included in a library system capable of installing the plurality of storage media can be brought into correspondence with the logical drivers.

As thus far summarized, according to the present invention, the data to be treated with the generalized operating system can be stored on and reproduced from the storage medium in the state in which it can be treated with the operating system.

PREFERRED EMBODIMENTS OF THE INVENTION

Now, embodiments of the present invention will be described with reference to the drawings.

Figure 1:
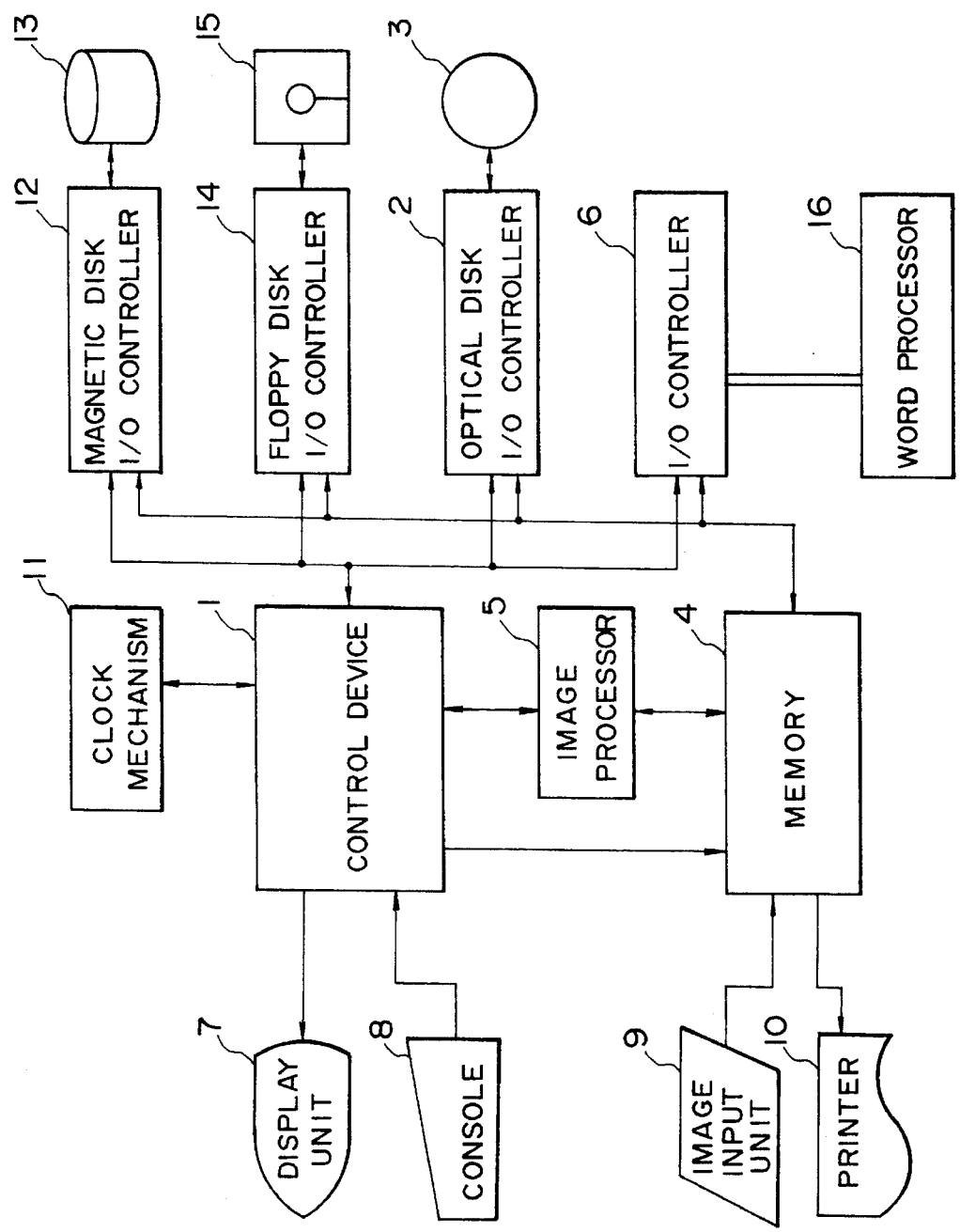
FIG. 1 is a block diagram showing the architecture of an information storing system according to an embodiment of the present invention.

FIG. 1 shows the architecture of one embodiment of an information storing system to which the information storing method of the present invention is applied.

The information storing system of this embodiment has a control device 1. The system comprises an image processor 5, a memory 4, a clock mechanism 11, a magnetic disk I/O (input/output) controller 12, a floppy disk I/O controller 14, an optical disk I/O controller 2, an I/O controller 6 for connecting the system with, e. g., another information processor, a display unit 7, and a console 8, all of which are connected to the control device.

Also, the information storing system of this embodiment includes an image input unit 9, a printer 10, a magnetic disk 13 as well as an unshown drive unit therefor, a floppy disk 15 as well as an unshown drive unit therefor, and an optical disk 3 as well as an unshown drive unit therefor.

In this embodiment, the optical disk 3 is a rewritable type, for example, an optomagnetic disk. Of course, the present invention is not restricted to this type of disks.

Further, the information storing system of this embodiment has a word processor 16 connected thereto through the I/O controller 6. It is also possible to connect a computer instead of or along with the word processor.

The information storing system of this embodiment has a generalized operating system installed in the control device 1, and it stores and reproduces information by the use of the storage media including the optical disk 3, under the control of the operating system. The operating system installed in the control device 1 functions as follows: Each of individual data storage areas, which are set on the storage media by segmenting the storage areas thereof, is logically regarded as one storage device and is logically dealt with by one driver. The control device 1 is instructed to read or write information out of or into each of the data storage areas through the corresponding logical driver. The structure of the data storage areas of the optical disk and the particulars of the logical drivers will be explained herebelow before the detailed descriptions of the constructions of the other various portions of this embodiment.

Figure 2:
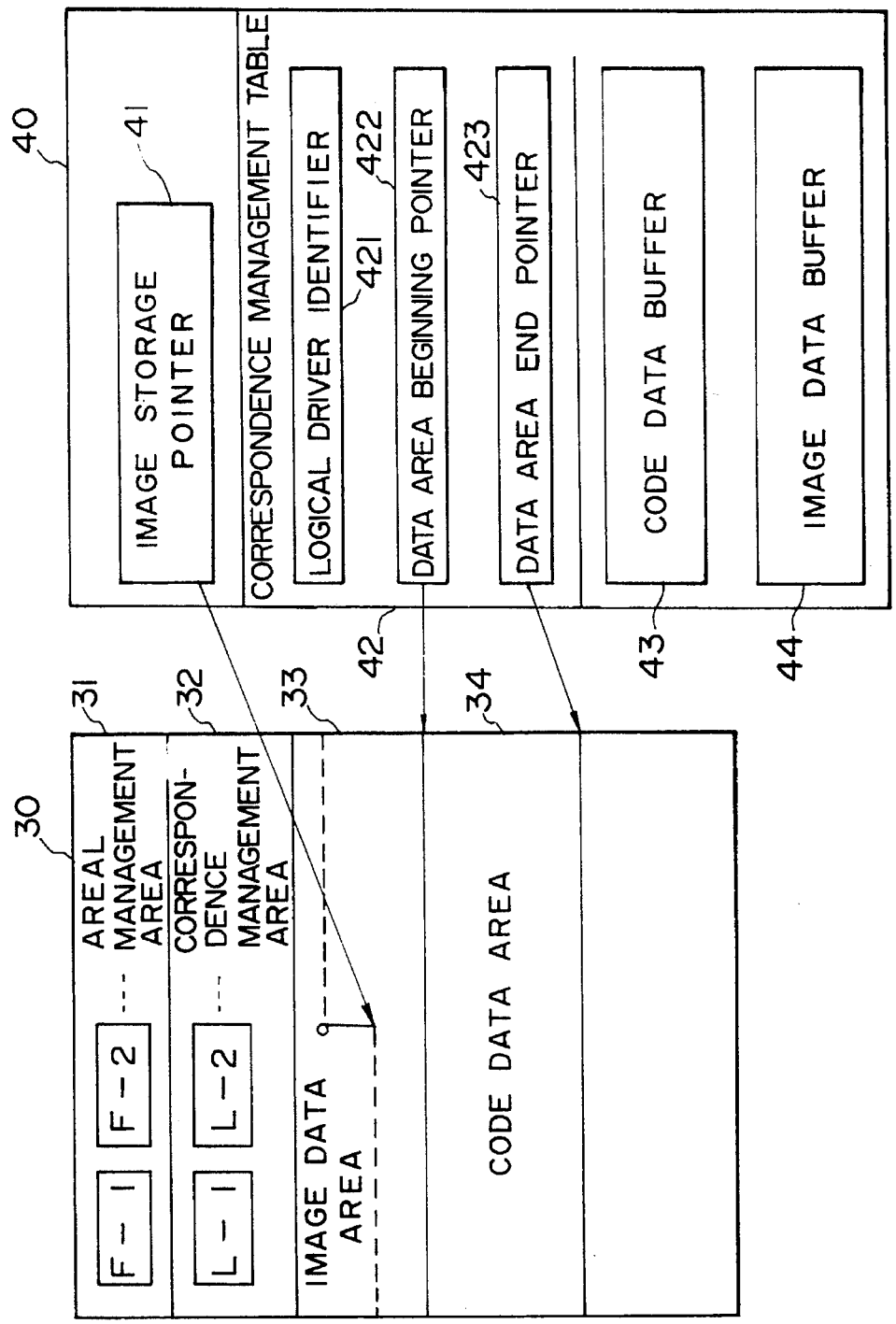
FIG. 2 is an explanatory diagram showing the form of storage in an optical disk and the structure of storage in a memory.
Figure 3A:
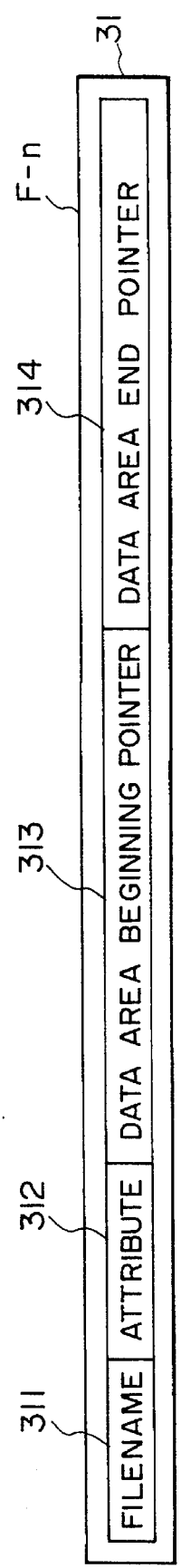
FIGS. 3A and 3B are explanatory diagrams each showing the format of the management information of the optical disk.
Figure 3B:
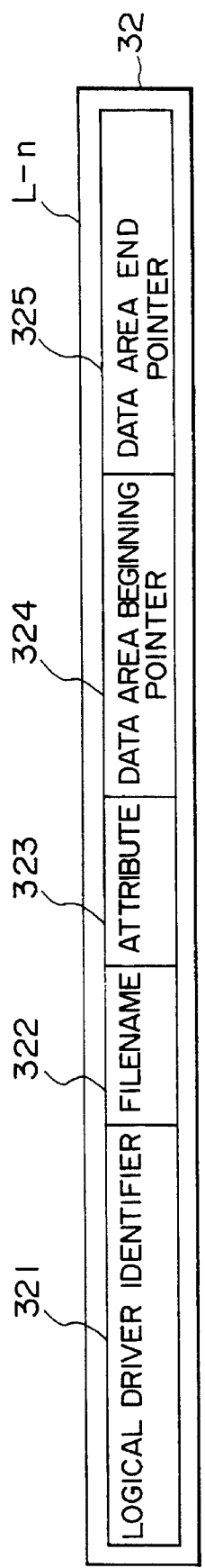
Figure 5:
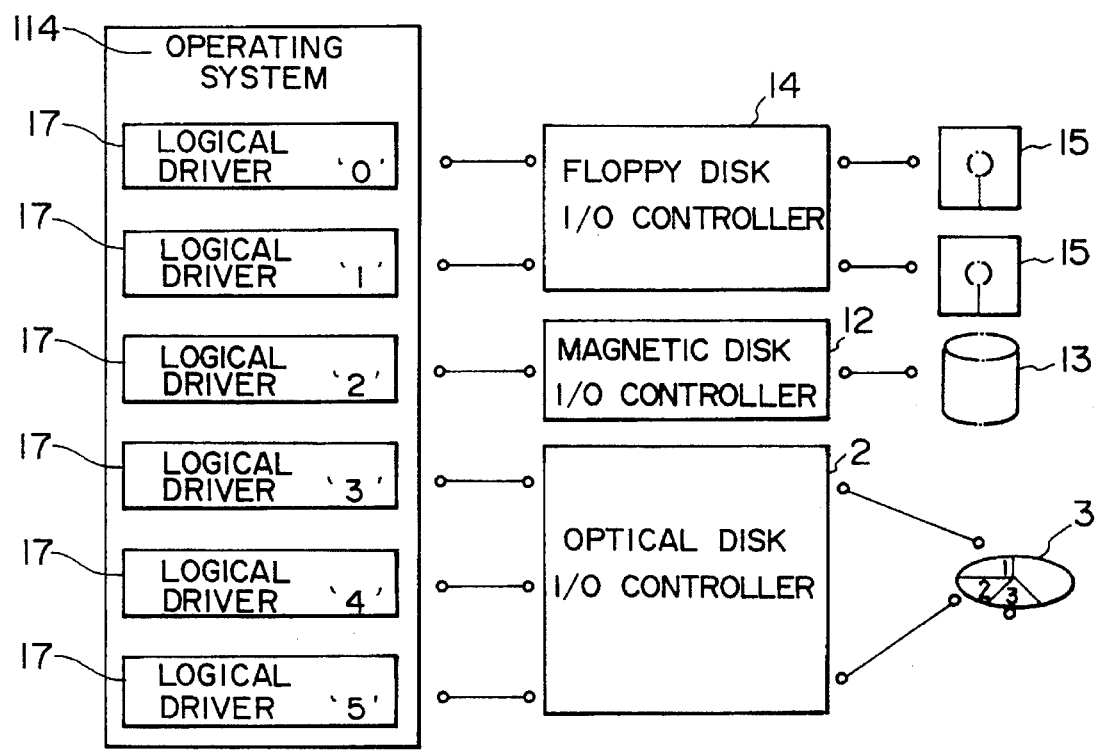
FIG. 5 is an explanatory diagram showing the correspondent relations between the logical drivers and several storage media.

FIG. 2 shows the structures of storage areas, FIGS. 3A and 3B show the formats of management information items, and FIG. 5 shows the corresponding relations between the logical drivers and the storage devices.

Referring to FIG. 2, numeral 30 indicates a storage area format on the optical disk 3, while numeral 40 indicates a storage area format on the memory 4. The storage area format 30 of this embodiment comprises an image data area 33, a code data area 34, an areal management area 31 for managing the individual data areas, and a correspondence management area 32 for storing correspondence information. On the other hand, the storage area format 40 of this embodiment comprises an image storage pointer 41, a correspondence management table 42, a code data buffer 43, and an image data buffer 44. The copy of the correspondence management table 42 can be kept on the optical disk 3.

The data storage area of the optical disk 3 is demarcated by pointers in the areal management area 31. The code data area 34 held in correspondence is also pointed at from the correspondence management table 42.

The management area 31 contains data area information items F-1, F-2, . . . which indicate the locations of the data storage areas set on the storage medium. As shown in FIG. 3A, each of the data area information items F-1, F-2, . . . contains a filename 311 which indicates the name of the pertinent data area, an attribute 312 which indicates a data attribute such as image data or code data, and a data area beginning pointer 313 and a data area end pointer 314 which indicate the limits of the data storage area.

The correspondence management area 32 is formed with correspondent relation information items L-1, L-2, . . . which indicate the correspondent relations between the respective logical drivers and the aforementioned data storage areas. As shown in FIG. 3B, each of the correspondent relation information items L-1, L-2, . . . contains a logical driver identifier 321, a filename 322 which indicates the name of the pertinent data storage area, an attribute 323 which indicates the attribute of the data storage area, and a data area beginning pointer 324 and a data area end pointer 325 which indicate the limits of the data storage area.

Figure 10:
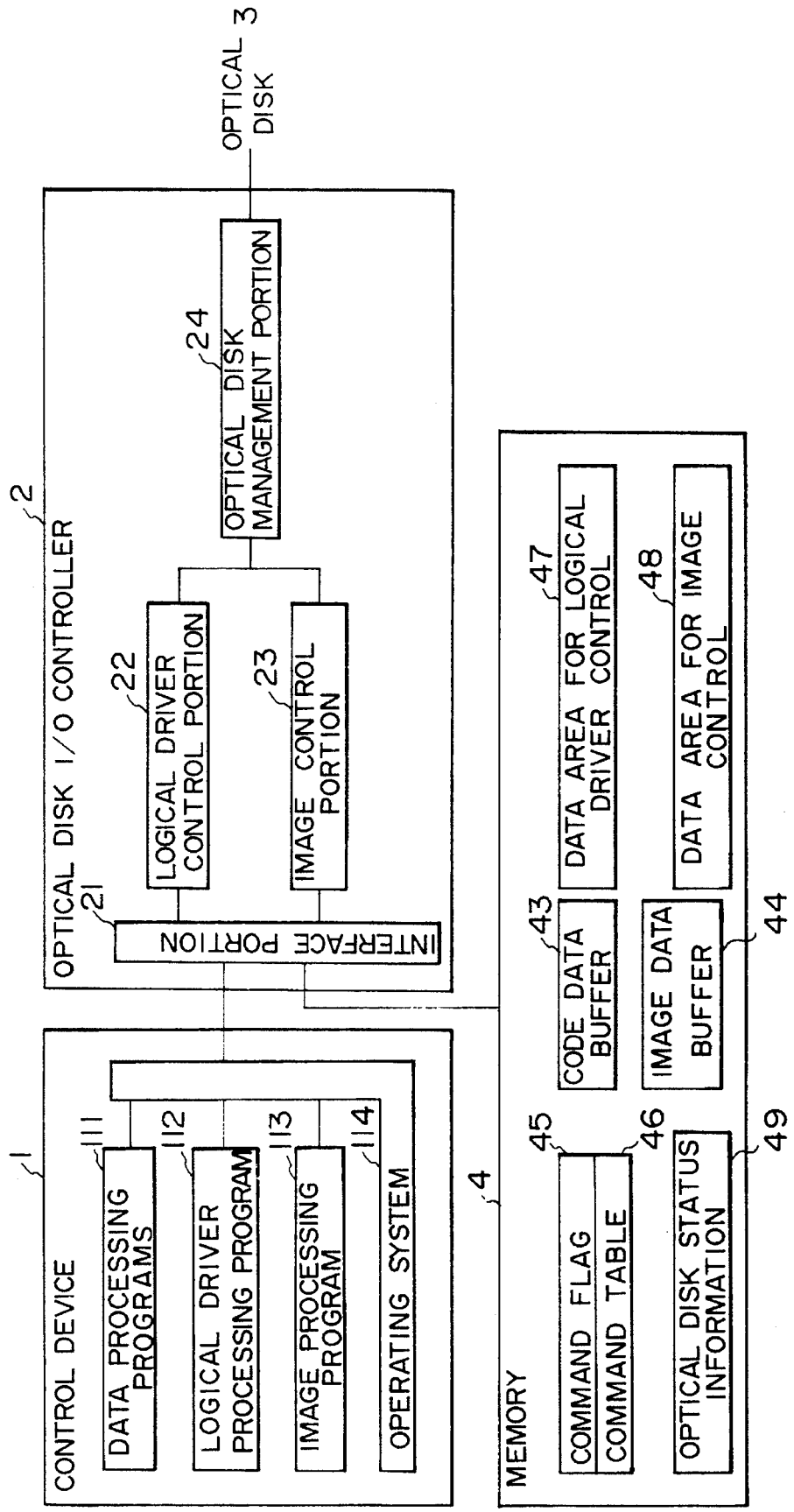
FIG. 10 is a block diagram showing the constitutions of a control device, an optical disk input/output controller, and a memory which are used in the embodiment illustrated in FIG. 1.

Here, the logical drivers are not physical devices, but they are logical drive devices which are virtually set in the operating system installed in the control device 1. More specifically, the operating system 114 (in FIG. 5) segments the storage area of each physical storage device into a plurality of suitable sizes, and it logically regards each of the segmental areas as one storage medium, to which one driver belongs virtually. As shown in FIG. 5 by way of example, a plurality of logical drivers 17 are prepared in, for example, an operating system to be stated below as shown in FIG. 10.

The logical drivers 17 are respectively endowed with identifiers peculiar thereto. The operator of the information storing system can store and reproduce information in and from the storage medium by designating the identifiers of the logical drivers. As an example, the identifiers, device Nos. indicated in FIG. 5 can be employed.

As stated before, each logical driver is brought into correspondence with one data storage area of the physical storage device. The correspondence is also made in such a way that the memory 4 shown in FIG. 1 is formed with the correspondence management table 42 as depicted in FIG. 2. By way of example, the table 42 contains for each logical driver, a device No. or identifier 421 which denotes the pertinent logical driver, and a data storage area beginning pointer 422 and a data storage area end pointer 423 which are the location information items of the corresponding data storage area.

The number of logical drivers can be set to correspond to the number of external storage devices which can be separately handled as the devices independent of one another by the control device 1 of the information storing system. As each of the external storage devices in this case, a magnetic disk device (hard disk), a floppy disk device, or the like having heretofore been handled as one device can be considered as a unitary or single device. By way of example, if the control device 1 can manage the input/output of data with six floppy disk devices connected thereto, the six logical drivers '0' thru '5' can be set as illustrated in FIG. 5. Of course, in a case where the operating system of the control device 1 can deal with a still larger number of external storage devices, the number of logical drivers can be increased within the maximum number of the logical drivers which the operating system can treat.

Besides, in a case where there are a plurality of of I/O controllers such as the optical disk I/O controller 2, magnetic disk I/O controller 12 and floppy disk I/O controller 14 as in this embodiment, at least one logical driver can be exclusively designated for every I/O controller beforehand. Regarding the optical disk 3, since the storage capacity is large, the data storage area is segmented to form storage devices which are independent of one another, and which are respectively brought into correspondence with the logical drivers. As to the optical disk 3, accordingly, it seems to the control device 1 that a plurality of external storage devices (in the number of the logical drivers) are existent. The storage capacity of each segmental area can be properly determined by the user of the information storing system. By way of example, it may well be conformed to the capacity of the storage medium of the magnetic disk device or to that of the floppy disk.

Next, the constructions of the individual parts of the system of this embodiment will be described in more detail.

The control device 1 includes a central processing unit and a memory which are omitted from illustration, and it controls the information storing system of this embodiment through the execution of programs which are stored in the unshown memory. More specifically, as shown in FIG. 10, the control device 1 is furnished therein with a program 111 for realizing various data processes including document generation, a logical driver processing program 112 for logically treating each of data storage areas as one driver an operating system 114 which sets, the data storage areas on the storage media through the segmentations of the storage areas thereof and an image processing program 113 for subjecting image data to the processes of writing, retrieval, reading, etc. The programs 111, 112 and 113 are run under the control of the operating system 114. Here, a generalized operating system is employed as the operating system 114. Incidentally, the programs of the control device 1 may well be stored in the memory 4.

The optical disk I/O controller 2 includes a central processing unit and a memory which are omitted from illustration. It performs various controls, for example, the allotment of the storage area of the optical disk 3, the data transfer between the optical disk 3 and the memory 4, and the input/output of data from and to a communication circuit not shown, through the execution of various programs stored in the unshown memory and in accordance with the instructions of the control device 1. Likewise, the magnetic disk I/O controller 12 and the floppy disk I/O controller 14 perform input/output controls in accordance with the instructions of the control device 1.

As shown in FIG. 10, the optical disk I/O controller 2 is furnished with an interface portion 21 which interfaces with the control device 1 as well as the memory 4, a logical driver control portion 22 which governs processes concerning the storage/reproduction of code data, an image control portion 23 which governs processes concerning the storage/reproduction of image data, and an optical disk management portion 24 which makes managements on the optical disk 3 including read/write processes.

Upon receiving a start signal from the control device 1, the interface portion 21 reads a command flag on the memory 4. It starts the image control portion 23 governing image data if the command flag is "1", whereas it starts the logical driver control portion 22 governing the code data if the command flag is "0". On condition that a command can be executed (that is, unless any command is being currently executed), the control portion 22 or 23 accepts the command and then transfers the command to a data area to be described later, which is formed in correspondence with the control portion 22 or 23 within the memory 4. After the transfer, the control portion 22 or 23 returns a reception response to the interface portion 21. Upon receiving the reception response from the control portion 22 or 23, the interface portion 21 falls into a status in which the next command is accepted. After returning the reception response, the control portion 22 or 23 executes the accepted command with the optical disk management portion 24 started if necessary. After the execution of the command, the control portion 22 or 23 reports the end of the command execution to the interface portion 21. Then, the interface portion 21 reports the end to the control device 1.

By the way, the command flag mentioned above is necessary only for the optical disk I/O controller 2 dealing with the plurality of sorts of data (code data and image data), and it is unnecessary for the other I/O controllers. The image processing program 113 sets this flag before the transmission of the command, and resets it after the end of the execution of the command. Thus, in cases where the various processing programs 111 set in the control device 1 use the segmental storage areas of the optical disk 3 as the logical drivers, they need not set/reset command flags in executing commands. Accordingly, the various processing programs 111 can use the optical disk 3 similarly to the magnetic disk 13 and the floppy disk 15. That is, these programs need not be altered in using the optical disk 3.

The logical driver control portion 22 accepts a correspondence command, and besides, the same commands as those of the magnetic disk I/O controller 12 and the floppy disk I/O controller 14 (commands for reading/writing code data, etc.). When it is the correspondence command, a correspondence filename as well as a logical driver identifier is checked, and the correspondence management area 32 as well as the correspondence management table 42 is thereafter updated. In each of the read/write commands, the correction of a data length, etc. are made in the code data buffer 43 lest the operating system 114, the various processing programs 111, etc. set in the control device 1 should need to be conscious of the physical characteristics of the optical disk 3 different from those of the other storage devices, whereupon the optical disk management portion 24 is started to read or write the code data.

The image control portion 23 accepts commands for reading/writing image data, etc. In the read command, the image data is retrieved, while in the write command, an image is written into an address indicated by the image storage pointer 41, which is thereafter updated.

When instructed to secure a storage area by the control portion 22 or 23, the optical disk management portion 24 inspects the remaining storage capacity of the optical disk 3 in view of the areal management area 31 thereof, and it secures the area on condition that the remaining storage capacity is larger than the area to-be-secured. Also, the management portion 24 checks the propriety of an address designated in the mode of reading or writing data. By way of example, in a case where the portion 24 has been requested to read or write data from or into the code data storage area 34 in spite of the set status of the command flag, it does not execute the read or write process. After the check, it transfers data between the optical disk 3 and the memory 4.

In addition, when the optical disk management portion 24 recognizes the setting or exchange of the optical disk 3, it brings an optical disk status information to "1". Both the control portions 22 and 23 refer to this information at all times. When this information becomes "1", the logical driver control portion 22 starts the optical disk management portion 24 first of all. Subsequently, the logical driver control portion 22 reads out the correspondence management area 32 through the optical disk management portion 24 and sets the content thereof in the correspondence management table 42 again. Thereafter, the portion 22 brings the optical disk status information to "2". Then, subject to the optical disk status information of "2", the image control portion 23 (starts the optical disk management portion 24 to search for the location of image information,) sets the image storage pointer 41 again and brings the optical disk status information to "3". In the case where the optical disk status information is "3", neither of the control portions 22 and 23 performs any operation.

In the above-described embodiment do not the control portions 22 and 23 accept a plurality of commands at the same time. To the contrary, the control portions 22 and 23 can be contrived so as to operate independently of each other without any mutual interference. It is therefore possible by way of example that, while an image data reading command from the image processing program 113 is under execution (during the command execution of the image control portion 23), a code data reading command from any other processing program is executed. Since, however, only one optical disk management portion 24 is provided in the described embodiment, it makes the execution of the read/write operation of the next command impossible 1. Therefore, each control portion divides the data size into certain sizes (for example, 1 track) and then gives the read or write instruction to the optical disk management portion 24. In this way, data items can be simultaneously delivered to a plurality of processing programs. By way of example, the image data reading command from the image processing program 113 and the code data reading command from a word-processor processing program are simultaneously accepted. Thus, the image processing program 113 can cause the image processor 5 to process image data and the display unit 7 to display the processed image data in succession. Meantime, the word-processor processing program can also cause the display unit 7 to successively display code data read out. This situation looks as if the plurality of processing programs were proceeding at the same time. Herein, it is assumed that the display unit 7 has its display screen divided and has the resulting divisional areas assigned to the individual processing programs by the operating system.

As shown in FIG. 10, the memory 4 is internally furnished with the areas of a code data buffer 43 and an image data buffer 44 for storing code data and image data, respectively, a command flag area 45 for storing a command flag, a command table 46 for storing a command, an optical disk status information area 49 for storing information indicating the status of the optical disk 3, a data area 47 for a logical driver control, and a data area 48 for an image control. Some of the data items indicated in the storage area format 40 on the memory 4 as shown in FIG. 2 are stored in the logical driver controlling data area 47 and the image controlling data area 48. Concretely, the image storage pointer 41 is stored in the image controlling data area 48. Besides, the correspondence management table 42 is stored in the logical driver controlling data area 47.

The image processor 5 encodes image data temporarily held in the memory 4, and registers the encoded image data in the optical disk 3 through the optical disk I/O controller 2. Conversely, it decodes the stored image data of the optical disk 3 and develops or evolves the image data in the memory 4.

A console 8 is constructed including an input appliance, for example, a keyboard or a mouse. It accepts the instruction of the operator and the input of data, and transmits them to the control device 1.

The display unit 7 is constructed of, for example, a CRT display. It displays input data and control information afforded from the console 8 and data appearing in the memory 4, under the control of the control device 1.

The image input unit 9 includes an image scanner or the like. It picks up the image of, e. g., a pattern depicted on a sheet of drawing and originates image data, which is transferred to the memory 4.

The printer 10 prints out image data or code data contained in the memory 4. Besides, the clock mechanism 11 keeps time.

Now, the operation of the information storing system according to this embodiment will be described.

First, how to secure a data storage area for image data or code data on the optical disk 3 will be explained. To secure a data storage area for image data or code data on the optical disk 3, the operator of the information storing system gives an instruction through the console 8. Then, the console 8 accepts the instruction and transmits it to the control device 1. The control device 1 issues a command instructing the optical disk I/O controller 2 to secure an area on the optical disk 3, and stores the command in the command table 46 of the memory 4. By way of example, this process can be done through the operating system 114 by the use of any of the various processing programs 111 or the image processing program 113. When the image processing program 113 is used for giving the command, the command flag 45 is set to "1".

In addition, the control device 1 starts the interface portion 21 of the optical disk I/O controller 2 simultaneously with the issue of the command. When started, the interface portion 21 operates as stated before, that is, it actuates either of the logical driver control portion 22 and the image control portion 23 depending on the status of the command flag in the area 45. Here, assuming by way of example that the logical driver control portion 22 is actuated, this portion 22 accepts the command stored in the command table 46 and stores it in the logical driver controlling data area 47. The logical driver control portion 22 sends the control device 1 a response indicating the acceptance of the command, and inquires of the control device 1 about the size of the area to-be-secured. Then, the control device 1 causes the display unit 7 to display a message requesting the operator to input the size of the area to-be-secured.

When the size of the area is input through the console 8, the control device 1 sends the logical driver control portion 22 the size of the area to-be-secured. Then, the logical driver control portion 22 starts the optical disk management portion 24. When instructed to secure the area by the logical driver control portion 22, the optical disk management portion 24 inspects the remaining storage capacity of the optical disk 3 in view of the areal management area 31 thereof. On condition that the remaining storage capacity is larger than the size given as the instruction, the portion 24 secures the storage area and executes the command.

In addition, when the operator instructs the control device 1 through the console 8 to display the status of the secured area of the optical disk 3 on the display unit 7, the control device 1 instructs the optical disk I/O controller 2 to transfer security status information indicating of the secured area status to the logical driver controlling data area 47 of the memory 4. Further, the control device 1 instructs the display unit 7 to display the security status information of the area in the memory 4. Then, the display unit 7 displays, for example, the capacity and first address of the secured data storage area, and the remaining storage capacity.

By the way, in instructing the control device 1 to secure the area from the console 8, the areal size may well be sent to the control device 1 along with the area securing command.

Next, the correspondence between the logical drivers and the data areas on the optical disk 3 will be explained. In reading or writing data out of or into the optical disk 3, the operator performs the operation of supposing one or more data storage areas on the optical disk 3 as the logical drivers, through the console 8 beforehand. Here, correspondence means is configured by the control device 1, the optical disk I/O controller 2, and the correspondence management table 42 of the memory 4.

In conformity with the operation, the control device 1 instructs the optical disk I/O controller 2 to bring the logical driver and the data storage area of the storage medium for use into correspondence. The optical disk I/O controller 2 transfers the information of the designated data area to the correspondence management table 42 included in the memory 4.

By the way, in the presence of correspondence information on the optical disk 3, the correspondence information is transferred from the correspondence management area 32 of the optical disk 3 to the memory 4 even when no instruction is given by the operator.

Figure 4:
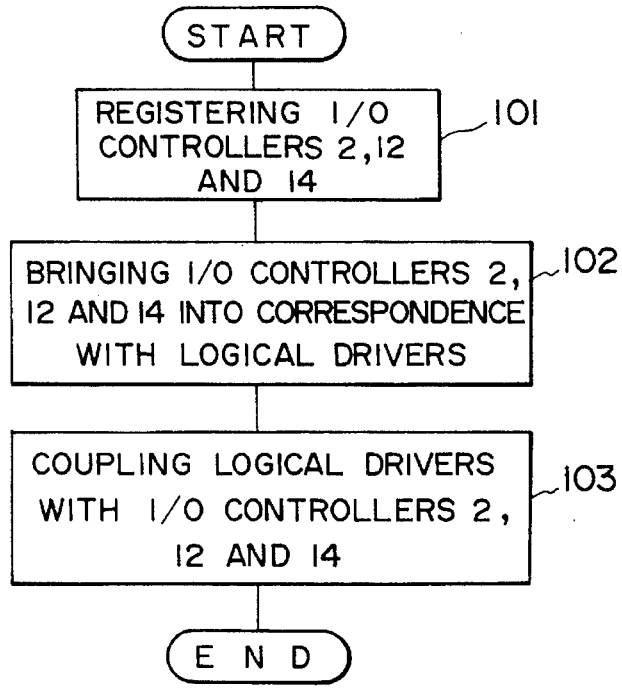
FIG. 4 is a flow chart showing the flow of a process for coupling logical drivers and data areas.

The operation of the correspondence between the logical drivers and the data storage areas for code data proceeds as shown in FIG. 4 by way of example. FIG. 4 illustrates the flow of the operation of the correspondence between the logical drivers and the code data areas.

First, at the setup of the information storing system of this embodiment, the optical disk I/O controller 2 for the optical disk 3 is registered in the operating system 114 (step 101).

Subsequently, at the closure of the power source of the storing system, the numbers of the logical drivers to be respectively assigned to the I/O controllers 2, 12 and 14 are reported to the control device 1 from, for example, the console 8. The I/O controllers 2, 12 and 14 are respectively brought into correspondence with the logical drivers in the reported numbers (step 102). This operation of the correspondence is, for example, the operation stated before in which data items equal in number to the necessary logical drivers are set for the respective logical drivers in the correspondence management table 42 shown in FIG. 2.

Further, at the closure of the system power source and at the setting or placement of the optical disk 3, the correspondence information is read out of the optical disk 3 if stored, and it is transferred to the correspondence management table 42 of the memory 4. Thus, the logical drivers are respectively coupled with the I/O controllers 2, 12 and 14 (step 103). Herein, if the correspondence information is not stored in the optical disk 3, the operator gives an instruction for bringing the logical drivers and the data storage areas into correspondence by the use of the correspondence management table 42 and for storing the correspondence. On this occasion, even when the logical drivers already coupled are designated, they are brought into correspondence anew.

In this way, the data storage areas of the optical disk 3 desired to be used can be changed-over easily and repeatedly just as switches are changed-over.

The correspondence exemplified in FIG. 5 is such that the logical drivers having identifiers or device Nos. '0' thru '5' have two of them assigned to the floppy disks 15, one to the magnetic disk 13, and three to the optical disk 3. In this case, even the optical disk 3 can be treated with the logical drivers likewise to the magnetic disk 13 and the floppy disk 15. Therefore, data can be readily copied between the magnetic disk 13 and the optical disk 3, between the floppy disk 15 and the optical disk 3, and between the optical disks 3 under the control of the operating system 114.

By bringing any desired area of the optical disk 3 into correspondence with the logical driver in this manner, it can be treated virtually equivalently to, for example, the data storage area of the magnetic disk. Therefore, data can be transferred to or from the optical disk 3 as in the magnetic disk device by designating the logical driver. In this case, it is also allowed that some of the data storage areas of the optical disk 3 are held in correspondence with the logical drivers, whereas the others are not. By way of example, it is possible that the areas for storing code data items are held in correspondence with the logical drivers, while image data items are directly transferred to and from the memory 4 without the correspondence with the logical drivers.

By the way, in a case where the number of the logical drivers is smaller than that of segmental areas for correspondence, all the segmental areas can be brought into correspondence with the logical drivers by rewriting the correspondent relations with the logical drivers. This holds true also in a case where the optical disk has been exchanged. In addition, the correspondence between the segmental area of the optical disk and the logical driver permits the code data to be transferred.

Next, an example of data transfer according to this embodiment will be described in detail.

Figure 6:
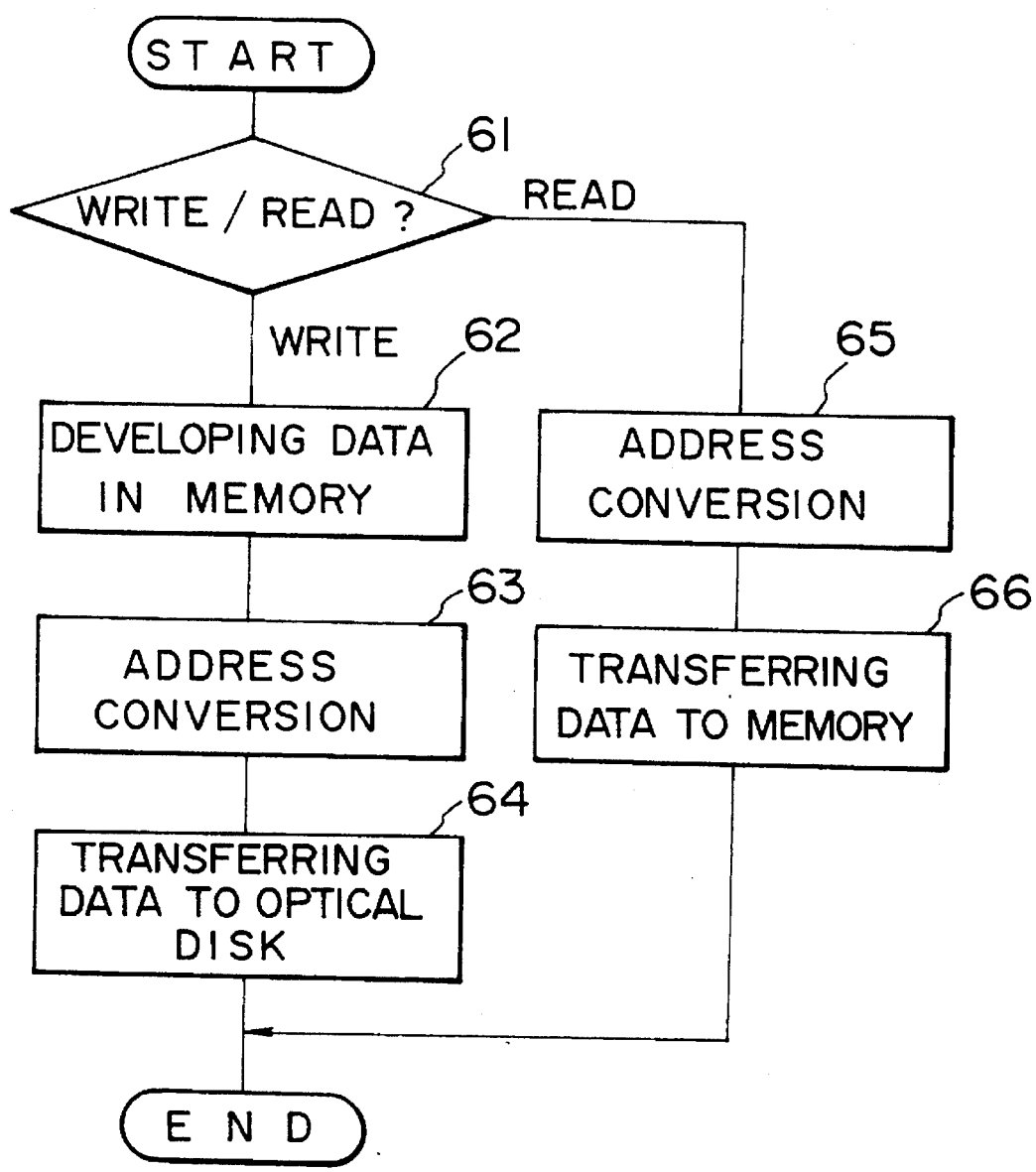
FIG. 6 is a flow chart showing the flows of processes for reading and writing data out of and into the optical disk.

FIG. 6 illustrates the flows of writing and reading data.

First, when the operator gives an instruction for reading or writing data with any logical driver designated, the control device 1 accepts the operator's instruction from the console 8 and decides whether the instruction is the operation of writing data or reading data (step 61). According to the result of the decision, the control device 1 instructs the optical disk I/O controller 2 to read or write data in compliance with the identifier of the logical driver. In the case of writing data into the optical disk 3, the control device 1 develops or evolves the data to-be-written in a storage space on the designated logical driver 17 (step 62). The input data to be written is, for example, data originated by the operator, data fetched from any desired input/output device, or data originated when any desired program has been run. The storage space is set in the predetermined storage area of the memory 4, for example, the code data buffer 43. Here, the transfer of code data shall be exemplified.

Subsequently, the optical disk I/O controller 2 fetches the correspondence information of the designated logical driver from the correspondence management table 42. In accordance with the correspondence information, the optical disk I/O controller 2 converts the address of the storage space on the logical driver 17 into that address of a storage space on the physical optical disk 3 which is a transfer destination (step 63). Lastly, the code data in the memory 4 is transferred to the destination address (step 64).

Conversely, in the case of reading out data from the optical disk 3, the address on the logical driver 17 is converted into the address on the optical disk 3 in accordance with the correspondence information in the same way as in the step 63 (step 65). Thereafter, the code data stored at the address of the optical disk 3 obtained in the step 65 is transferred to the code data buffer 43 of the memory 4 (step 66).

By the way, in a case where that data storage area of the optical disk 3 to or from which the data is to be transferred is not found in the correspondence table 42, the correspondence information is searched for with reference to the correspondence management area 32 stored on the optical disk 3. In the presence of the corresponding information, the contents thereof are written into the area of the pertinent logical driver of the correspondence table 42. Besides, in a case where data is to be stored anew in the unused data storage area of the optical disk 3 having no correspondent relation with any logical driver, a correspondent relation is set anew by an instruction from the console 8. Thus, the areal management information F-n and the correspondent relation information L-n are formed anew in the areal management area 31 and correspondence management area 32 on the optical disk 3, respectively.

Figure 7:
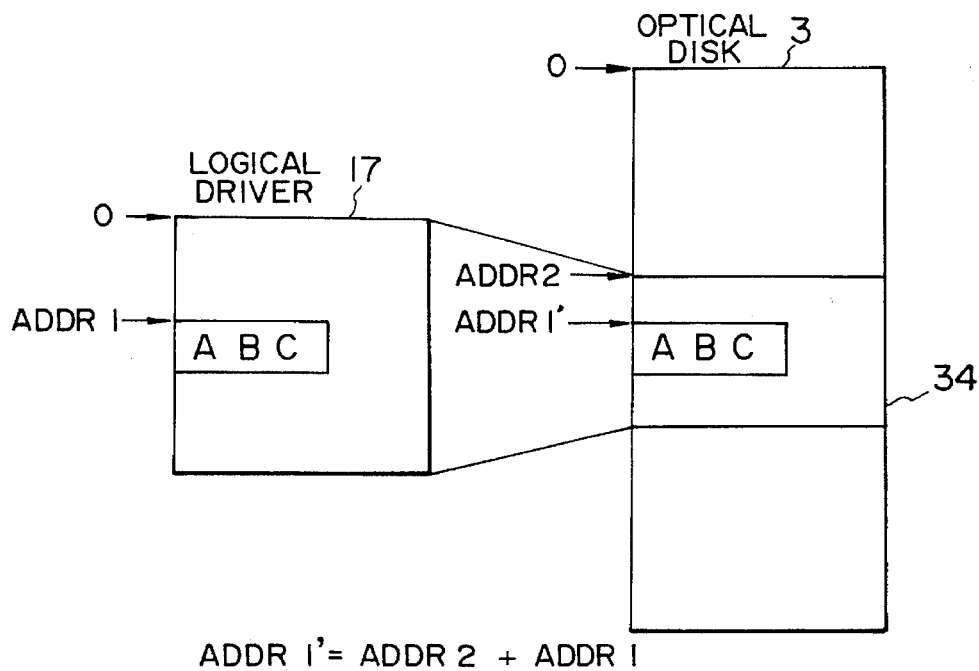
FIG. 7 is an explanatory diagram showing the relation between the logical driver and the storage space of the optical disk.

FIG. 7 shows the address conversion indicated as each of the steps 63 and 65 in the flow chart of FIG. 6.

A character code "ABC" located at any address ADDR1 of the logical driver 17 is physically located at an address ADDR1' in the code data area 34 on the optical disk 3. The address ADDR1' is the sum between the first address ADDR2 of the code data area 34 held in correspondence with the logical driver 17 and the address ADDR1 on the logical driver 17.

Next, the storage of image data will be explained.

The image data is stored in the image data area 33 shown in FIG. 2, and has the address of an empty area (unused area) in the image storage pointer 41.

Figure 8:
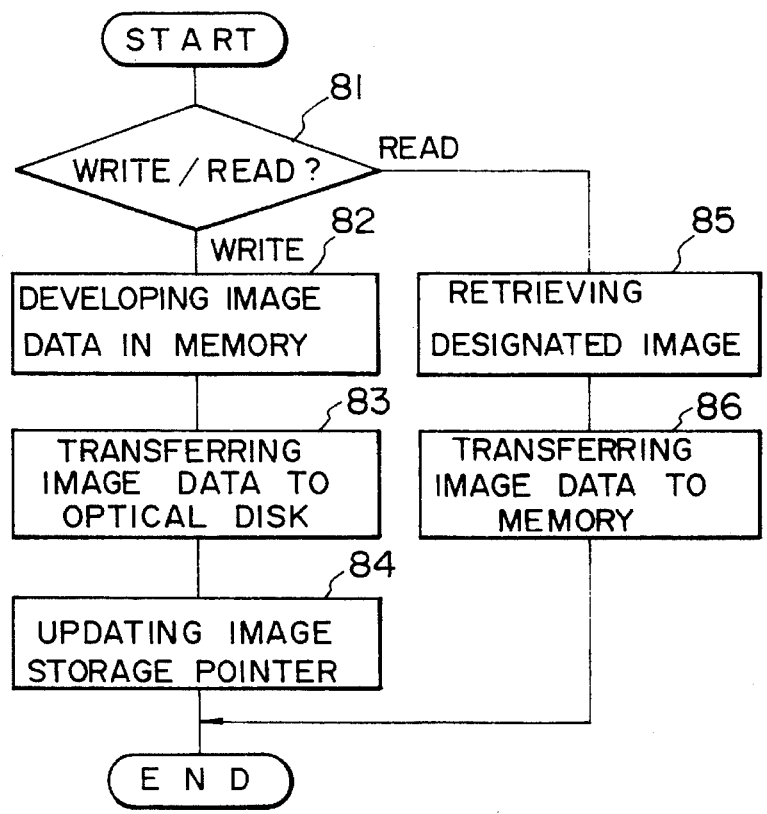
FIG. 8 is a flow chart showing the flows of the operations of writing and reading image data into and out of the optical disk.

FIG. 8 shows the flows of writing and reading such image data into and out of the optical disk 3.

First, the control device 1 accepts the instruction of the operator from the console 8 and decides whether the instruction is the operation of writing or reading image data (step 81).

In the case of writing the image data into the optical disk 3, the image data is input from, e. g., the image input unit 9 in accordance with the operator's instruction and is developed or evolved on the image data buffer 44 of the memory 4 (step 82). Apart from the input image data afforded from the image input unit 9, the image data to be developed in the memory 4 is, for example, data read out from the optical disk 3, or data originated or edited by the image processor 5.

Subsequently, image data in the memory 4 is transferred to the position of the image storage pointer 41 of the image data area 33 designated by the operator (step 83). In this case, the transfer is effected without the intervention of any logical driver 17. Lastly, the image storage pointer 41 is updated to the amount of the size of the data transferred red in the step 83 (step 84).

In the case of reading out the image data from the optical disk 3, the processing flow proceeds as follows:

First, the control device 1 starts the image processing program 113. In accordance with the image processing program 113, the control device 1 retrieves an image designated by the operator, in a space extending from the beginning of the image data area 33 to the image storage pointer 41 in conformity with designated retrieval conditions (step 85). The retrieval conditions to be designated are the filename of the image data, and other retrieval keys previously given. Such other retrieval keys are, for example, a pattern contained in the image data, a specified key word or code, and the date of storage. The filename of the image data is stored as the areal management information F-n in the areal management area 31. Besides, the retrieval keys other than the filename can be stored in an additional information area provided at a part of the image data area 33, and in correspondence with the filename by way of example.

Here, in a case where the image meeting the retrieval conditions is not existent as the result of the retrieval, the absence of the pertinent image is reported to the operator by, e. g., the display unit 7. On the other hand, in a case where the pertinent image is existent, the image data having been found is transferred to the memory 4 (step 86). Thereafter, the image data transferred to the memory 4 is edited by the image processor 5, displayed on the display unit 7, or/and printed on paper by the printer 10 in accordance with the instruction(s) of the operator.

Data items in which code data and image data coexist are written as stated below.

First, the control device 1 separates the code data and the image data. That is, code data parts and image data parts in a file are respectively turned into independent files. On this occasion, information items indicating the arrangement relations between the code data parts and the image data parts are conserved in at least either of the file of the code data parts and that of the image data parts. The separated code data is written into the optical disk 3 by designating any of the logical drivers 17 as described before with reference to FIG. 6. On the other hand, the image data is written in such a way that, in the image data writing operation illustrated in FIG. 8 referred to before, the image storage pointer 41 is written along with the code data into the code data area 34 for storing the corresponding code data part.

In addition, data items in which code data and image data coexist are read out as stated below.

First, the mode of reading out the code data is as explained before. On the other hand, the mode of reading out the image data proceeds in such a way that the retrieval of the image data in the step 85 shown in FIG. 8 referred to before is replaced with reading out the image storage pointer 41 written into the code data area 34 in the image data writing mode, and fetching the image data from the area indicated by the image storage pointer 41 read out. The fetched image data is transferred to the memory 4. In the memory 4, the code data and the image data loaded therein are combined. At the step of the combination, the information expressing the arrangement relation of the code data and the image data as has been stored in either file at the separation into both the data items is referred to. The combined data items are displayed on the display unit 7 or printed out on paper by the printer 10.

Figure 9:
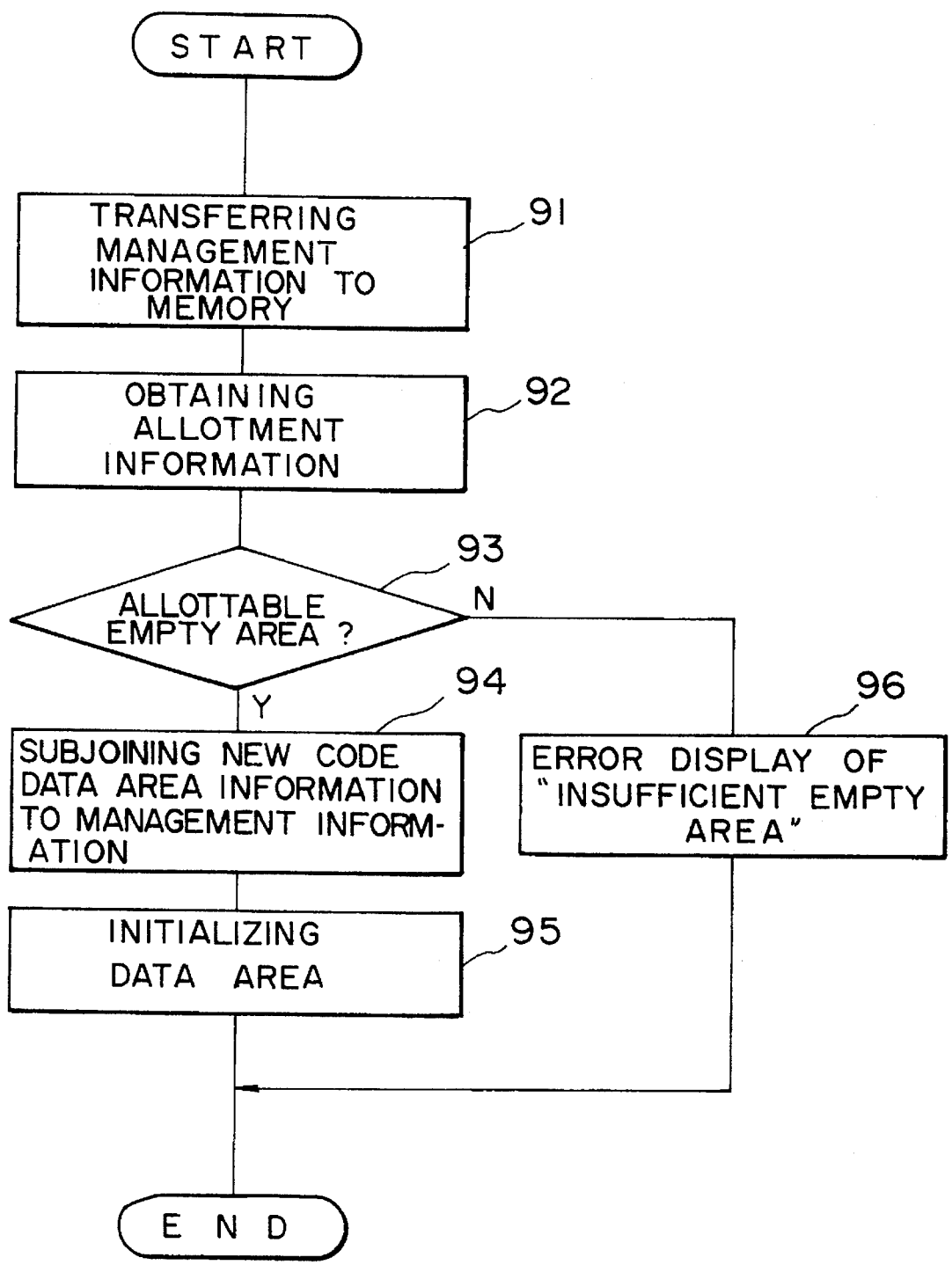
FIG. 9 is a flow chart showing the flow of a process for allotting data areas to the optical disk.

Next, the allotment of the data area of the optical disk 3 will be described with reference to FIG. 9.

In accordance with the operator's instruction for the data area allotment, the optical disk I/O controller 2 fetches the areal management information F-n from the areal management area 31 of the optical disk 3 and transfers the fetched information to the memory 4 so as to obtain empty area information (step 91, step 92). In view of the empty area information obtained, the controller 2 checks whether or not the pertinent empty area is allottable to the data area having a size designated by the operator (step 93). If the allotment is impossible as the result of the check, the processing is ceased and an error signal is displayed (step 96). On the other hand, if the allotment is possible as the checked result, new areal management information is subjoined to the areal management area 31 (step 94). Lastly, the data area is initialized so as to be capable of storing data (step 95). By way of example, the initialization is such that the data area is set by the operating system into a storage format which this operating system uses.

By allotting data areas in this manner, the plurality of image data areas 33 and the plurality of code data areas 34 are permitted to exist on the single optical disk 3. This makes it possible with the single optical disk that a document generated by the word processor is stored in the image data areas 33 in the form of image data left intact, while code data items are stored in the code data areas 34.

Moreover, keys for the retrieval of image data are stored in the code data areas 34 and are fetched in the retrieval mode, whereby the retrieval can be quickened and simplified.

As thus far described, according to this embodiment, code data areas and logical drivers are respectively brought into correspondence, whereby the code data areas in a large number of optical disks and the plurality of code data areas in a single optical disk can be used as the logical drivers.

In addition, this embodiment can store image data and code data coexistingly on a storage medium. Moreover, it has an architecture in which the image data of large data quantity is transferred between the memory 4 and the optical disk 3 directly without the intervention of the logical driver. Thus, according to this embodiment, the code data as to which the stored data is often re-edited and then utilized can be stored via the logical driver which is accessible from the control device 1, while the image data which is seldom re-edited can be transferred at high speed.

Incidentally, although the foregoing embodiment describes the storage of data in optical disks, data items can also be transferred through logical drivers corresponding to a magnetic disk or a floppy disk, in case of storing the data items in the magnetic or floppy disk.

Although the foregoing embodiment is so constructed as to write and read image data without the intervention of the logical drivers, the present invention is not restricted to this construction. By way of example, the image data may well be stored through the logical driver.

Moreover, the present invention is also applicable to a system in which large amounts of information are stored using a plurality of optical disks, for example, a library system. In this case, logical drivers are brought into correspondence for each of the optical disks, and correspondence information items are transferred to the correspondence management table 42 each time the optical disk is placed on a physical drive device, whereby the logical drivers and data storage areas can be brought into correspondence for each optical disk.

As set forth above, according to the present invention, a storage medium is formed with a plurality of areas which are segmented into sizes treatable with a generalized operating system, and which can be managed by bestowing logical driver identifiers, respectively. Besides, according to the present invention, a large storage capacity can be effectively utilized by the use of the logical driver identifiers in a limited number.

Further, in the present invention, image data and code data are respectively stored in association with each other, whereby the code data can be stored in a storage structure treatable with the generalized operating system, while the image data can be stored in the storage medium directly without the intervention of the generalized operating system.

What is claimed is:

1. An information storage system comprising:
    a storage medium having a data storage area for storing data and a correspondence management area for storing correspondence relation information stipulating a correspondent relation between at least one logical drive and an area of said data storage area;
    a control device for controlling said information storage system, said control device being an input/output device separately provided as a physical element in said information storage system, and comprising an operating system, and at least one logical drive controlled by said operating system, said logical drive being logically set in said control device, to perform reading and writing of a corresponding data storage area;
    means for supplying instructions to said control device; and
    an input/output controller for controlling input and output of data to or from said storage medium or other storage medium, said input/output controller comprising a logical drive control portion which operates to refer to said correspondence relation information and to permit a designated logical drive to access an area of said data storage area that corresponds to said designated logical drive.

2. The system of claim 1, wherein said correspondence relation information includes an identifier for identifying the logical drive, a filename defining the name of stored data, an attribute indicating whether the stored data is code data or image data, and pointers indicating the data storage area.

3. The system of claim 2, further comprising a management area for storing management information indicating a location of the stored data in said storage medium.

4. The system of claim 3, wherein said storage medium is an optical disk.

5. The system of claim 1, further comprising:
    a memory accessible from each of said control device and said input/output controller.

6. The system of claim 5, wherein said memory stores therein a correspondent relation table.

7. The system of claim 6, wherein said correspondent relation table contains a device number which indicates an identifier of the logical drive, and pointers which indicate limits of the data storage area that corresponds to said logical drive.

8. The system of claim 5, wherein an optical disk is employed as said storage medium, and an optical disk input/output controller is employed as said input/output controller.

9. The system of claim 8, wherein said optical disk is of a rewritable type.

10. The system of claim 9, wherein said optical disk input/output controller includes an interface portion which interfaces with said control device as well as said memory, a logical drive control portion which governs processing concerning storage and reproduction of code data, an image control portion which governs processing concerning storage and reproduction of image data, and an optical disk management portion which manages operation of said optical disk including read and write processes.

11. The system of claim 10, wherein said memory includes a code data buffer for storing code data, an image data buffer for storing image data, and an area for storing a command table containing a command to be executed by said input/output controller, as well as a command flag for distinguishing whether data to be processed is code data or image data.

12. The system of claim 11, wherein said memory further includes an optical disk status information area for storing information indicating a status of said optical disk, and a data area for controlling the logical drive.

13. A method for storing and retrieving information in an information storage system comprising a storage medium having a data storage area for storing data and a correspondence management area for storing correspondence relation information, and a control device for controlling the information storage system, said control device having an operating system and being an input/output device separately provided as a physical element in said information storage system, said method comprising the steps of:
    storing information, logically setting at least one logical drive in said control device, said logical drive being controlled by said operating system of said control device;
    generating correspondence relation information for said logical drive, said correspondence relation information stipulating a correspondent relation between each logical drive with an area of said data storage area, said logical drive performs reading and writing of said area of said data storage area;
    storing said correspondence relation information in said correspondence management area; and
    retrieving stored information from an area of said data storage area by causing said control device to designate said logical drive that corresponds to the area to be accessed, and accessing the area of said data storage area with said designated logical drive.

14. The method of claim 13, wherein said data storage area is segmented into a code data storage area and an image data storage area.

15. The method of claim 14, wherein said code data area stores therein information indicating a location of associated image data in said image data area.

16. The method of claim 14, wherein an optical disk is employed as said storage medium.

17. The method of claim 13, wherein said correspondence relation information includes an identifier for the logical drive, a filename for stored data, an attribute indicating whether the stored data is code data or image data, and pointers indicating the data storage area.

18. The method of claim 13, wherein said storage medium is segmented into a plurality of areas having sizes which being capable of controlling a limited of logical drives, can handle, and each of said plurality of areas corresponds to one of said at least one logical drive, respectively so as to be managed by said operating system.

* * * * *